US012340768B2

(12) United States Patent
Meng et al.

(10) Patent No.: US 12,340,768 B2
(45) Date of Patent: Jun. 24, 2025

(54) BACKLIGHT CONTROL CHIP, DRIVING METHOD, BACKLIGHT CONTROL SYSTEM, AND NEAR-EYE DISPLAY DEVICE

(71) Applicants: Beijing BOE Optoelectronics Technology Co., Ltd., Beijing (CN); BOE Technology Group Co., Ltd., Beijing (CN)

(72) Inventors: Zhaohui Meng, Beijing (CN); Zijiao Xue, Beijing (CN)

( * ) Notice: Subject to any disclaimer, the term of this patent is extended or adjusted under 35 U.S.C. 154(b) by 0 days.

(21) Appl. No.: 18/705,572

(22) PCT Filed: Dec. 24, 2021

(86) PCT No.: PCT/CN2021/141342

§ 371 (c)(1),
(2) Date: Apr. 28, 2024

(87) PCT Pub. No.: WO2023/115569

PCT Pub. Date: Jun. 29, 2023

(65) Prior Publication Data

US 2024/0420651 A1 Dec. 19, 2024

(51) Int. Cl.
*G09G 3/34* (2006.01)
*G09G 3/00* (2006.01)

(52) U.S. Cl.
CPC ........... *G09G 3/3406* (2013.01); *G09G 3/001* (2013.01); *G09G 2320/0209* (2013.01); *G09G 2330/021* (2013.01); *G09G 2330/028* (2013.01); *G09G 2340/0435* (2013.01)

(58) Field of Classification Search
CPC .................................................... G09G 3/3406
See application file for complete search history.

(56) References Cited

U.S. PATENT DOCUMENTS

| | | | | |
|---|---|---|---|---|
| 9,122,443 | B1 * | 9/2015 | Lamborn | G09G 5/12 |
| 2010/0053228 | A1 | 3/2010 | Yeo et al. | |
| 2010/0156946 | A1 | 6/2010 | Kim et al. | |

FOREIGN PATENT DOCUMENTS

| | | | |
|---|---|---|---|
| CN | 1155211 | A | 7/1997 |
| CN | 104680975 | A | 6/2015 |
| CN | 106097983 | A | 11/2016 |
| CN | 107632394 | A | 1/2018 |
| CN | 113506545 | A | 10/2021 |
| JP | 2013205574 | A | 10/2013 |

OTHER PUBLICATIONS

PCT/CN2021/141342 international search report dated Sep. 28, 2022.

* cited by examiner

*Primary Examiner* — Gustavo Polo
(74) *Attorney, Agent, or Firm* — IPro, PLLC

(57) ABSTRACT

A backlight control chip, a driving method, a backlight control system, and a near-eye display device. The backlight control chip for driving a backlight module, includes: a boosting circuit, configured to receive a variable-frequency clock signal and boost the variable-frequency clock signal into a synchronous signal, wherein both the variable-frequency clock signal and the synchronous signal have the same refresh rate as variable-frequency display; and a gating circuit, configured to at least receive the synchronous signal and frame rate control signals, and control output of the synchronous signal in response to the frame rate control signals.

20 Claims, 4 Drawing Sheets

BACKLIGHT CONTROL CHIP, DRIVING METHOD, BACKLIGHT CONTROL SYSTEM, AND NEAR-EYE DISPLAY DEVICE

CROSS REFERENCE TO RELATED APPLICATIONS

The present disclosure is a National Stage of International Application No. PCT/CN2021/141342, filed Dec. 24, 2021, which is hereby incorporated by reference in its entirety.

TECHNICAL FIELD

The present disclosure relates to the field of the display technology, and in particular to a backlight control chip, a driving method, a backlight control system, and a near-eye display device.

BACKGROUND

The near-eye display is a current research hotspot, such as the virtual reality display in the form of a helmet and the augmented reality display in the form of smart glasses. The near-eye display can provide people with an unprecedented sense of interaction, and has important application value in many fields such as the telemedicine, industrial design, education, military virtual training, and entertainment, etc.

SUMMARY

The specific solutions of the backlight control chip, the driving method, the backlight control system, and the near-eye display device provided by the present disclosure are as follows.

On the one hand, an embodiment of the present disclosure provides a backlight control chip for driving a backlight module, including: a boosting circuit, configured to receive and boost a variable-frequency clock signal into a synchronous signal, wherein both the variable-frequency clock signal and the synchronous signal have the same refresh rate as variable-frequency display; and a gating circuit, configured to at least receive the synchronous signal and frame rate control signals, and control output of the synchronous signal in response to the frame rate control signals.

In some embodiments, in the above-mentioned backlight control chip provided by the embodiments of the present disclosure, the gating circuit is configured to receive the synchronous signal, a fixed frequency signal, a variable-frequency signal, a first frame rate control signal and a second frame rate control signal; control switching output between the synchronous signal and the variable-frequency signal in response to the first frame rate control signal; and then control switching output between the synchronous signal or the variable-frequency signal and the fixed frequency signal in response to the second frame rate control signal. The fixed frequency signal is used for completing generation of a main clock signal inside the backlight control chip, the variable-frequency signal is not associated with the refresh rate of the variable-frequency display, and the frame rate control signals include the first frame rate control signal and the second frame rate control signal.

In some embodiments, in the above-mentioned backlight control chip provided by the embodiments of the present disclosure, the gating circuit includes a first gating device and a second gating device, wherein a control terminal of the first gating device is loaded with the first frame rate control signal, a first input terminal of the first gating device is loaded with the variable-frequency signal, and a second input terminal of the first gating device is loaded with the synchronous signal; and a control terminal of the second gating device is loaded with the second frame rate control signal, a first input terminal of the second gating device is electrically connected to an output terminal of the first gating device, and a second input terminal of the second gating device is loaded with the fixed frequency signal.

In some embodiments, the above-mentioned backlight control chip provided by the embodiments of the present disclosure further includes a first voltage stabilization filter circuit, wherein the first voltage stabilization filter circuit is configured to perform voltage stabilization and filtering processing on the variable-frequency clock signal provided by a clock signal terminal, and provide the variable-frequency clock signal after the voltage stabilization and filtering processing to the boosting circuit.

In some embodiments, in the above-mentioned backlight control chip provided by the embodiments of the present disclosure, the first voltage stabilization filter circuit includes an even number of cascaded first NOT gates.

In some embodiments, the above-mentioned backlight control chip provided by the embodiments of the present disclosure further includes a protection circuit configured to provide an effective level of the variable-frequency clock signal to the first voltage stabilization filter circuit and prevent the effective level in the first voltage stabilization filter circuit from flowing back to the clock signal terminal.

In some embodiments, in the above-mentioned backlight control chip provided by the embodiments of the present disclosure, the protection circuit includes: a first resistor, a second resistor, a third resistor, a diode, a switching transistor, a second NOT gate, a third NOT gate and a first AND gate. The first resistor is connected between the clock signal terminal and the first voltage stabilization filter circuit, a first terminal of the second resistor is electrically connected to the first voltage stabilization filter circuit, a second terminal of the second resistor is electrically connected to a first terminal of the third resistor, a second terminal of the third resistor is grounded, an anode of the diode is grounded, a cathode of the diode is electrically connected to the clock signal terminal, a control terminal of the switching transistor is electrically connected to an output terminal of the first AND gate, a first electrode of the switching transistor is electrically connected to the second terminal of the second resistor, a second electrode of the switching transistor is grounded, an input terminal of the second NOT gate is electrically connected to the second terminal of the second resistor, an output terminal of the second NOT gate is electrically connected to an input terminal of the third NOT gate, a first input terminal of the first AND gate is electrically connected to the output terminal of the second NOT gate, and a second input terminal of the first AND gate is loaded with the first frame rate control signal.

In some embodiments, the above-mentioned backlight control chip provided by the embodiments of the present disclosure further includes a second voltage stabilization filter circuit, configured to perform voltage stabilization and filtering processing on the synchronous signal, and provide the synchronous signal after the voltage stabilization and filtering processing to the gating circuit.

In some embodiments, in the above-mentioned backlight control chip provided by the embodiments of the present disclosure, the second voltage stabilization filter circuit includes an even number of cascaded fourth NOT gates.

In some embodiments, the above-mentioned backlight control chip provided by the embodiments of the present disclosure further includes a noise reduction circuit, configured to perform noise reduction processing on the synchronous signal after the voltage stabilization and filtering processing, and provide the synchronous signal after the noise reduction processing to the gating circuit.

In some embodiments, in the above-mentioned backlight control chip provided by the embodiments of the present disclosure, the noise reduction circuit includes: a fourth resistor and a capacitor, wherein the fourth resistor is connected between the second voltage stabilization filter circuit and the gating circuit, and the capacitor is connected between the gating circuit and ground.

In some embodiments, the above-mentioned backlight control chip provided by the embodiments of the present disclosure further includes an analog phase locker, configured to generate a backlight driving timing with the same refresh rate as an output signal of the gating circuit in response to the output signal of the gating circuit.

In some embodiments, the above-mentioned backlight control chip provided by the embodiments of the present disclosure further includes a digital phase locker configured to receive a fixed frequency signal and generate a variable-frequency signal according to the fixed frequency signal.

In some embodiments, the above-mentioned backlight control chip provided by the embodiments of the present disclosure further includes a third voltage stabilization filter circuit, configured to provide a stable analog enabling signal to the analog phase locker, and provide a stable digital enabling signal to the digital phase locker.

In some embodiments, in the above-mentioned backlight control chip provided by the embodiments of the present disclosure, the third voltage stabilization filter circuit includes: a fifth NOT gate, a sixth NOT gate, a seventh NOT gate, a second AND gate, a third AND gate, a fourth AND gate, and an OR gate. An input terminal of the fifth NOT gate is loaded with the second frame rate control signal, an output terminal of the fifth NOT gate is electrically connected to the first input terminal of the second AND gate, the second input terminal of the second AND gate is loaded with a trigger signal, the output terminal of the second AND gate is electrically connected to an enabling input terminal of the digital phase locker, an input terminal of the sixth NOT gate is electrically connected to a first output terminal of the digital phase locker, an output terminal of the sixth NOT gate is electrically connected to a first input terminal of the seventh NOT gate, a second input terminal of the seventh NOT gate is electrically connected to the output terminal of the fifth NOT gate, an output terminal of the seventh NOT gate is electrically connected to the first input terminal of the third AND gate, the second input terminal of the third AND gate is loaded with the trigger signal, the output terminal of the third AND gate is electrically connected to the enabling input terminal of the analog phase locker, a first input terminal of the fourth AND gate is loaded with the analog enabling signal, a first input terminal of the fourth AND gate is loaded with the first frame rate control signal, an output terminal of the fourth AND gate is electrically connected to a first input terminal of the OR gate, and a second input terminal of the OR gate is electrically connected with a second output terminal of the digital phase locker.

On the other hand, an embodiment of the present disclosure provides a method for driving the aforementioned backlight control chip, including: receiving the variable-frequency clock signal and boosting the variable-frequency clock signal into the synchronous signal, wherein both the variable-frequency clock signal and the synchronous signal have a same refresh rate as the variable-frequency display; and at least receiving the synchronous signal and the frame rate control signals, and controlling output of the synchronous signal in response to the frame rate control signals, to drive the backlight module according to the output synchronous signal.

On the other hand, an embodiment of the present disclosure provides a backlight control system, including: the backlight control chip provided by the embodiments of the present disclosure, a power supply providing chip, a logic control chip, a backlight power supply chip, and a display driver chip; wherein, the power supply providing chip is configured to provide a working voltage for the backlight control chip, the logic control chip, the backlight power supply chip and the display driver chip; the logic control chip is configured to control enabling and logic operation of the backlight control chip, the backlight power supply chip, and the display driver chip; the backlight power supply chip is configured to provide a driving voltage for the backlight module; and the display driver chip is configured to provide a driving voltage for the display module and a fixed frequency signal for the backlight control chip.

On the other hand, an embodiment of the present disclosure provides a near-eye display device, including a display module, a backlight module, and the above-mentioned backlight control system.

DETAILED DESCRIPTION

Figure 1:
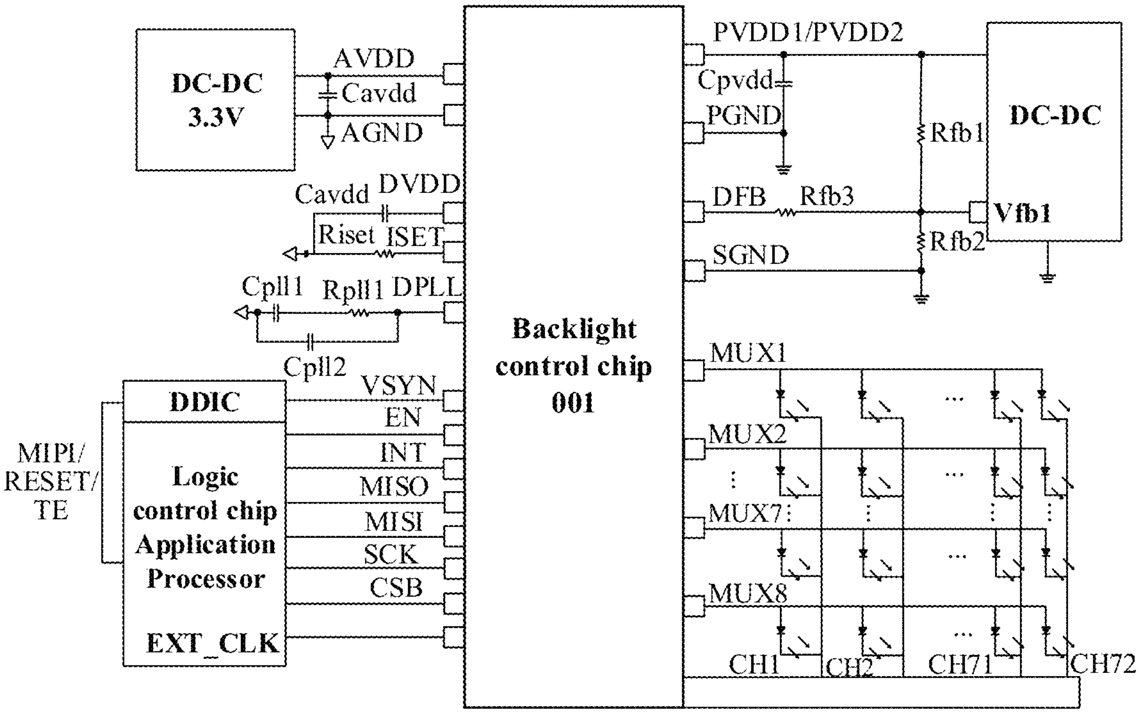
FIG. 1 is a schematic structural diagram of a backlight control chip provided by an embodiment of the present disclosure.

In order to make the purpose, technical solutions and advantages of the embodiments of the present disclosure clearer, the technical solutions of the embodiments of the present disclosure will be clearly and completely described below in conjunction with the accompanying drawings of the embodiments of the present disclosure. It should be noted that the size and shape of each figure in the drawings do not reflect the true scale, but are only intended to illustrate the present disclosure. And the same or similar reference numerals represent the same or similar elements or elements having the same or similar functions throughout.

Unless otherwise defined, the technical terms or scientific terms used herein shall have the usual meanings understood by those skilled in the art to which the present disclosure belongs. "First", "second" and similar words used in the description and claims of the present disclosure do not indicate any order, quantity or importance, but are only used to distinguish different components. Words such as "include" or "comprise" mean that the element or item appearing before the word includes the elements or items listed after the word and their equivalents, without excluding other elements or items. "Inner", "outer", "upper", "lower" and so on are only used to indicate the relative positional relationship. When the absolute position of the described object changes, the relative positional relationship may also change accordingly.

In the near-eye display (such as virtual reality (VR), augmented reality (AR), mixed reality (MR)) system, the binocular stereo vision plays an important role. The images seen by the user's two eyes are different, and are displayed on different display screens after being generated separately. After the user wears the near-eye display device, one eye can only see odd-numbered frames of images, and the other eye can only see even-numbered frames of images. After the human eyes acquire these images with differences, the stereoscopic sense is created in the mind.

When the display screen shows that the object is moving, what the eyes see is: as the position changes, the trajectory of the object is a line. Since after the image is displayed in each point on the display screen for a time duration, it will jump to the next point, the best and simplest way to make the image of the object move more continuously is to increase the refresh rate. Considering that a higher refresh rate will increase power consumption, in order to balance the display effect and power consumption, the display screen can be designed as the variable-frequency display. Specifically, when displaying static images, the refresh rate of the display screen is reduced, to reduce power consumption; and when displaying dynamic video images, especially when rapidly changing images on the competitive game, the refresh rate of the display screen is increased, to achieve the best display effect. In the case that the display screen is designed as the variable-frequency display, it is necessary to perform the variable-frequency design on the backlight, and ensure the synchronous variable-frequency of the backlight and the video content. However, merely adjusting the backlight frequency requires re-powering the backlight control chip and updating the driver codes, which may cause the backlight to flash out and then light up again, affecting the user experience.

Figure 2:
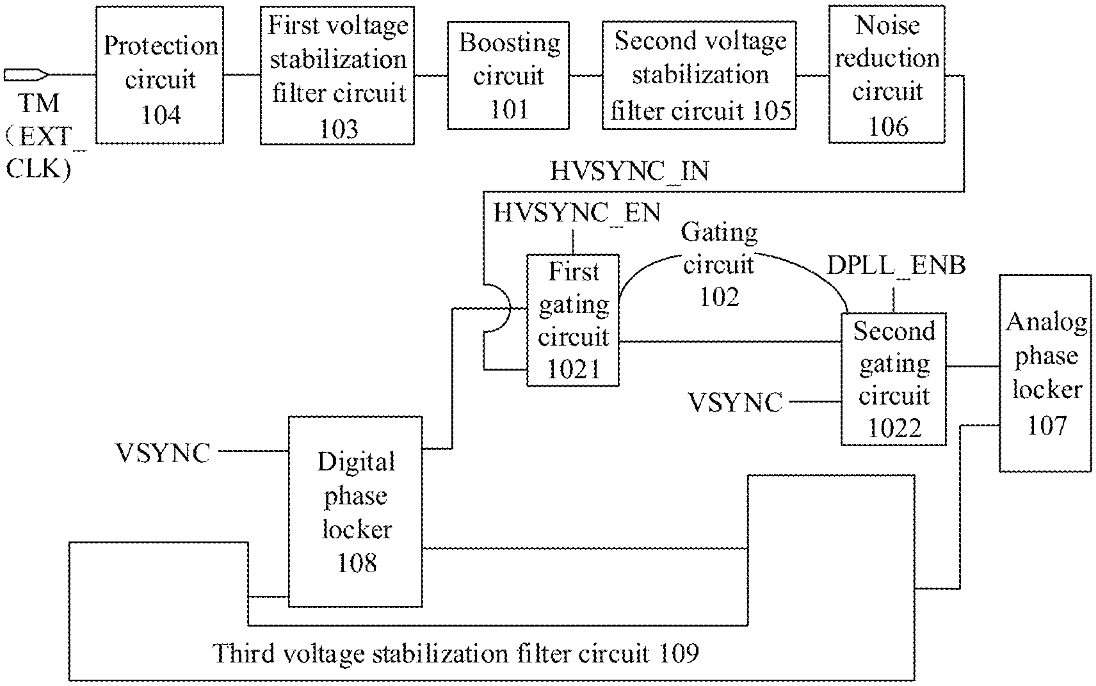
FIG. 2 is a schematic structural diagram of circuits in a backlight control chip provided by an embodiment of the present disclosure.
Figure 3:
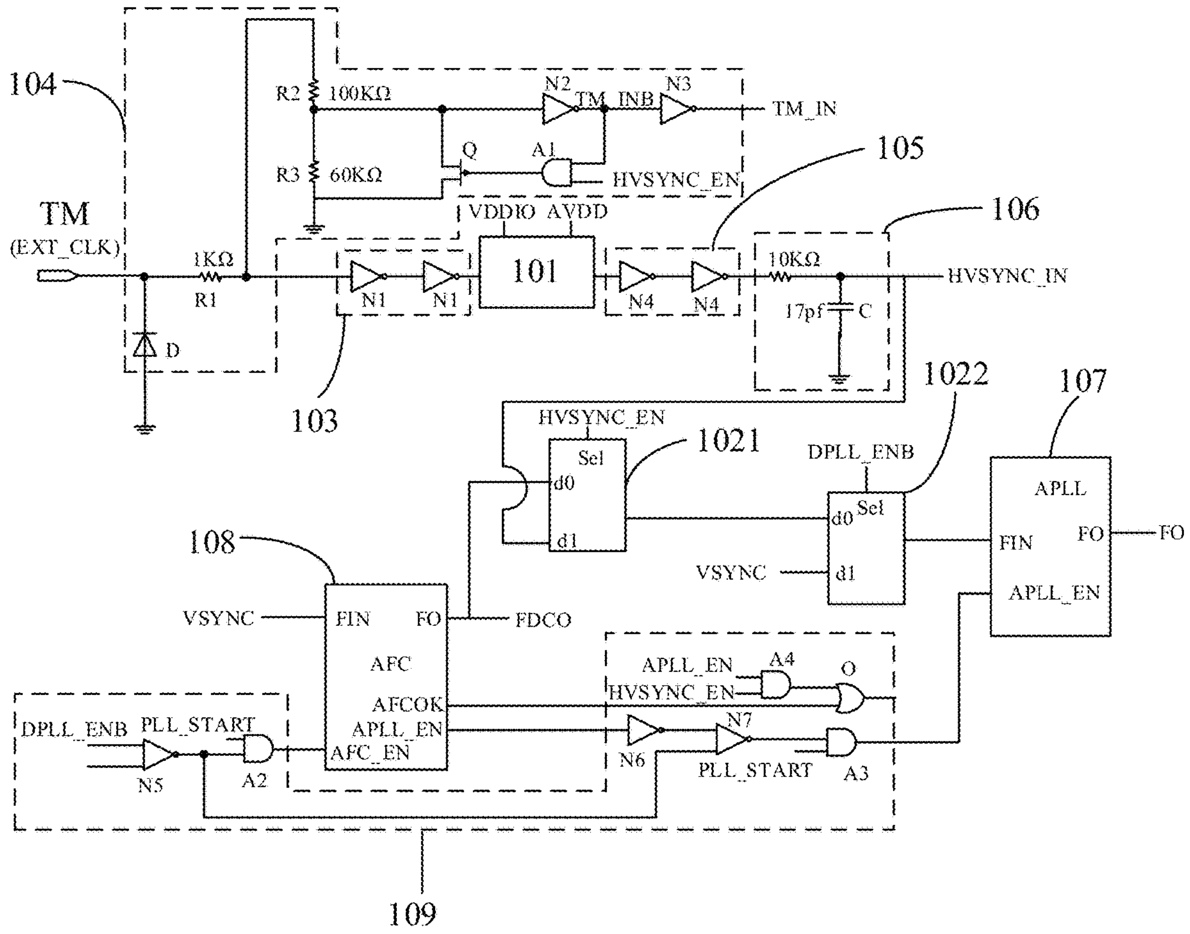
FIG. 3 is a schematic diagram of a specific structure of circuits in a backlight control chip provided by an embodiment of the present disclosure.

In order to improve the above-mentioned technical problem existing in the related art, an embodiment of the present disclosure provides a backlight control chip 001 for driving a backlight module, as shown in FIG. 1 to FIG. 3, including: a boosting circuit 101, configured to receive a variable-frequency clock signal and boost the variable-frequency clock signal EXT_CLK into a synchronous signal HVSYNC_IN, for example boosting to a square wave signal with an amplitude of 3.3V, wherein both the variable-frequency clock signal EXT_CLK and the synchronous signal HVSYNC_IN have the same refresh rate as the variable-frequency display; and a gating circuit 102, configured to at least receive the synchronous signal HVSYNC_IN and frame rate control signals (such as HVSYNC_EN and DPLL_ENB), and control output of the synchronous signal HVSYNC_IN in response to the frame rate control signals (such as HVSYNC_EN and DPLL_ENB).

In the above-mentioned backlight control chip 001 provided by the embodiment of the present disclosure, the external variable-frequency clock signal EXT_CLK is boosted by the boosting circuit 101 into the synchronous signal HVSYNC_IN that can be used by the backlight control chip 001, and the output of the synchronous signal HVSYNC_IN is realized through the gating circuit 102 under the action of the frame rate control signals (such as HVSYNC_EN and DPLL_ENB), which enables the backlight module to work based on the synchronous signal HVSYNC_IN synchronized with the variable-frequency display, so that it is not necessary to re-power the backlight control chip 001, and the backlight module will not flash off and then light up again, improving the user experience.

In some embodiments, the backlight control chip 001 provided by the embodiments of the present disclosure is designed with a working voltage region, a multiplexed channel region, and a logic control input region, wherein the working voltage region is configured to be loaded with the power signal, and the multiplexed channel region is configured to externally connect the lamp bead drive channel of the backlight module through the multiplexing switch(es) MUX, and the logic control input region is configured to be loaded with the control signal. In the present disclosure, the working voltage region and the multiplexed channel region are not improved, in other words, the circuit structure described in the present disclosure belongs to the improvement of the logic control input region. In addition, since the variable-frequency clock signal EXT_CLK (see FIG. 1) is added while other signals remain unchanged in the present application compared with the related art, the functions of the existing signals in FIG. 1 are not expanded in the present disclosure.

In some embodiments, in the above-mentioned backlight control chip provided by the embodiments of the present disclosure, as shown in FIG. 2 and FIG. 3, the gating circuit 102 is configured to: receive the synchronous signal HVSYNC_IN, a fixed frequency signal VSYNC, a variable-frequency signal 512*x*VSYNC, a first frame rate control signal HVSYNC_EN and a second frame rate control signal DPLL_ENB; control the switching output between the synchronous signal HVSYNC_IN and the variable-frequency signal 512*x*VSYNC in response to the first frame rate control signal HVSYNC_EN; and then control the switching output between the synchronous signal HVSYNC_IN or variable-frequency signal 512*x*VSYNC and the fixed frequency signal VSYNC in response to the second frame rate control signal DPLL_ENB. Here, the fixed frequency signal VSYNC is used for completing the generation of the main clock signal inside the backlight control chip 001, the variable-frequency signal 512*x*VSYNC is not associated with the refresh rate of the variable-frequency display, and the frame rate control signals include a first frame rate control signal HVSYNC_EN and a second frame rate control signal DPLL_ENB.

Since the variable-frequency signal 512*x*VSYNC and the fixed frequency signal VSYNC are used in the related art to drive the backlight module to work synchronously with the display screen, the gating circuit 102 in the present disclosure can control the selective output of the synchronous signal HVSYNC_IN, the variable-frequency signal 512*x*VSYNC or the fixed frequency signal VSYNC, so that the backlight control chip 001 can be compatible with the related art, to facilitate product upgrading. In specific implementation, the fixed frequency signal VSYNC can still be used to complete the generation of the main clock inside the backlight control chip 001 during display. When the synchronous variable-frequency with the display frequency is required, the synchronous signal HVSYNC_IN generated the variable-frequency clock signal EXT_CLK can be referred to, to realize the synchronous variable-frequency work control of the backlight module.

In some embodiments, in the above-mentioned backlight control chip provided by the embodiments of the present disclosure, as shown in FIG. 2 and FIG. 3, the gating circuit 102 may include a first gating device 1021 and a second gating device 1022, wherein, a control terminal of the first gating device 1021 is loaded with the first frame rate control signal HVSYNC_EN, a first input terminal of the first gating device 1021 is loaded with the variable-frequency signal 512*x*VSYNC, and a second input terminal of the first gating device 1021 is loaded with the synchronous signal HVSYNC_IN; and a control terminal of the second gating device 1022 is loaded with the second frame rate control signal DPLL_ENB, a first input terminal of the second gating device 1022 is electrically connected to the output terminal of the first gating device 1021, and a second input terminal of the second gating device 1022 is loaded with the fixed frequency signal VSYNC.

Specifically, the first gating device 1021 can respond to the first frame rate control signal HVSYNC_EN to realize the switching output between the synchronous signal HVSYNC_IN and the variable-frequency signal 512*x*VSYNC. Moreover, when the first gating device 1021 outputs the synchronous signal HVSYNC_IN, the second gating device 1022 can respond to the second frame rate control signal DPLL_ENB to realize the switching output between the synchronous signal HVSYNC_IN and the fixed frequency signal VSYNC. When the first gating device 1021 outputs the variable-frequency signal 512*x*VSYNC, the second gating device 1022 can respond to the second frame rate control signal DPLL_ENB to realize the switching output between the variable-frequency signal 512*x*VSYNC and the fixed frequency signal VSYNC.

In some embodiments, the above-mentioned backlight control chip provided in the embodiments of the present disclosure, as shown in FIG. 2 and FIG. 3, may further include a first voltage stabilization filter circuit 103, wherein the first voltage stabilization filter circuit 103 is configured to perform voltage stabilization and filtering processing on the variable-frequency clock signal EXT_CLK provided by a clock signal terminal TM, and provide the variable-frequency clock signal EXT_CLK after the voltage stabilization and filtering processing to the boosting circuit 101. Optionally, the first voltage stabilization filter circuit 103 may include an even number (such as, 2) of cascaded first NOT gates (also referred to as inverters) N1. Specifically, the variable-frequency clock signal EXT_CLK changes with the change of the refresh rate of the variable-frequency display. After being loaded into the backlight control chip 001, the variable-frequency clock signal EXT_CLK passes through the first voltage stabilization filter circuit 103 including two first NOT gates N1 to form a stable periodic signal that changes following the refresh rate of the variable-frequency display.

In some embodiments, the above-mentioned backlight control chip provided by the embodiments of the present disclosure, as shown in FIG. 2 and FIG. 3, may further include a protection circuit 104, wherein the protection circuit 104 is configured to provide an effective level (such as the high level) of the variable-frequency clock signal EXT_CLK to the first voltage stabilization filter circuit 103 and prevent the effective level (such as the high level) in the first voltage stabilization filter circuit 103 from flowing back to the clock signal terminal TM. Optionally, the protection circuit 104 may include: a first resistor R1, a second resistor R2, a third resistor R3, a diode D, a switching transistor Q, a second NOT gate N2, a third NOT gate N3 and a first AND gate A1. Wherein, the first resistor R1 is connected between the clock signal terminal TM and the first voltage stabilization filter circuit 103, a first terminal of the second resistor R2 is electrically connected to the first voltage stabilization filter circuit 103, a second terminal of the second resistor R2 is electrically connected to a first terminal of the third resistor R3, a second terminal of the third resistor R3 is grounded, an anode of the diode D is grounded, a cathode of the diode D is electrically connected to the clock signal terminal TM, a control terminal of the switching transistor Q is electrically connected to an output terminal of the first AND gate A1, a first electrode of the switching transistor Q is electrically connected to the second terminal of the second resistor R2, a second electrode of the switching transistor Q is grounded, an input terminal of the second NOT gate N2 is electrically connected to the second terminal of the second resistor R2, an output terminal of the second NOT gate N2 is electrically connected to an input terminal of the third NOT gate N3, a first input terminal of the first AND gate A1 is electrically connected to the output terminal of the second NOT gate N2, and a second input terminal of the first AND gate A1 is loaded with the first frame rate control signal HVSYNC_EN.

In some embodiments, the above-mentioned backlight control chip provided by the embodiments of the present disclosure, as shown in FIG. 2 and FIG. 3, may further include a second voltage stabilization filter circuit 105, wherein the second voltage stabilization filter circuit 105 is configured to perform voltage stabilization and filtering processing on the synchronous signal HVSYNC_IN, and provide the synchronous signal HVSYNC_IN after the voltage stabilization and filtering processing to the gating circuit 102, to the first gating device 1021. Optionally, the second voltage stabilizing filter circuit 105 includes an even number (such as, 2) of cascaded fourth NOT gates N4.

In some embodiments, the above-mentioned backlight control chip provided by the embodiments of the present disclosure, as shown in FIG. 2 and FIG. 3, may further include a noise reduction circuit 106, wherein the noise reduction circuit 106 is configured to perform noise reduction processing on the synchronous signal HVSYNC_IN after the voltage stabilization and filtering processing, and provide the synchronous signal HVSYNC_IN after the noise reduction processing to the gating circuit 102, to the first gating device 1021. Optionally, the noise reduction circuit 106 may include: a fourth resistor R4 and a capacitor C, wherein the fourth resistor R4 is connected between the second voltage stabilization filter circuit 105 and the gating circuit 102 (specifically, the first gating device 1021), and the capacitor C is connected between the gating circuit 102 (specifically, the first gating device 1021) and the ground.

In some embodiments, the above-mentioned backlight control chip provided by the embodiments of the present disclosure, as shown in FIG. 2 and FIG. 3, may further include an analog phase locker (APLL) 107, wherein the analog phase locker 107 is configured to generate a backlight driving timing with the same refresh rate as the output signal of the gating circuit 102 (specifically, the second gating device 1022) in response to the output signal of the gating circuit 102 (specifically, the second gating device 1022).

In some embodiments, the above-mentioned backlight control chip provided by the embodiments of the present disclosure, as shown in FIG. 2 and FIG. 3, may further include a digital phase locker (AFC) 108, wherein the digital phase locker 108 is configured to receive a fixed frequency signal VSYNC, and generate a variable-frequency signal 512*x*VSYNC according to the fixed frequency signal VSYNC.

In some embodiments, the above-mentioned backlight control chip provided by the embodiments of the present disclosure, as shown in FIG. 2 and FIG. 3, may further include a third voltage stabilization filter circuit 109, wherein the third voltage stabilization filter circuit 109 is configured to provide a stable analog enabling signal APLL_EN to the analog phase locker 107, and provide a stable digital enabling signal AFC_EN to the digital phase locker 108. Optionally, the third voltage stabilization filter circuit 109 includes: a fifth NOT gate N5, a sixth NOT gate N6, a seventh NOT gate N7, a second AND gate A2, a third AND gate A3, a fourth AND gate A4 and an OR gate O. Wherein, an input terminal of the fifth NOT gate N5 is loaded with the second frame rate control signal DPLL_ENB, an output terminal of the fifth NOT gate N5 is electrically connected to the first input terminal of the second AND gate A2, the second input terminal of the second AND gate A2 is loaded with a trigger signal PLL_START, the output terminal of the second AND gate A2 is electrically connected to an enabling input terminal (that is, the pin loaded with the digital enabling signal AFC_EN) of the digital phase locker 108, an input terminal of the sixth NOT gate N6 is electrically connected to a first output terminal APLL_RUN of the digital phase locker 108, an output terminal of the sixth NOT gate N6 is electrically connected to a first input terminal of the seventh NOT gate N7, a second input terminal of the seventh NOT gate N7 is electrically connected to the output terminal of the fifth NOT gate N5, an output terminal of the seventh NOT gate N7 is electrically connected to the first input terminal of the third AND gate A3, the second input terminal of the third AND gate A3 is loaded with the trigger signal PLL_START, the output terminal of the third AND gate A3 is electrically connected to the enabling input terminal (that is, the pin loaded with the analog enabling signal APLL_EN) of the analog phase locker 107, a first input terminal of the fourth AND gate A4 is loaded with the analog enabling signal APLL_EN, a first input terminal of the fourth AND gate A4 is loaded with the first frame rate control signal HVSYNC_EN, an output terminal of the fourth AND gate A4 is electrically connected to a first input terminal of the OR gate O, and a second input terminal of the OR gate O is electrically connected with a second output terminal AFCOK of the digital phase locker 108.

It should be noted that FIG. 3 is only an example to illustrate the specific structure of various circuits in the backlight control chip 001 provided by the embodiment of the present disclosure. In specific implementation, the specific structure of the above circuits is not limited to the above structure provided by the embodiment of the present disclosure, but may also be other structures known by those skilled in the art, which are not limited herein.

Based on the same inventive concept, an embodiment of the present disclosure provides a driving method for the above-mentioned backlight control chip, which may include: receiving the variable-frequency clock signal and boosting a variable-frequency clock signal into a synchronous signal, wherein both the variable-frequency clock signal and the synchronous signal have the same refresh rate as the variable-frequency display; and at least receiving the synchronous signal and frame rate control signals, and controlling output of the synchronous signal in response to the frame rate control signals, to drive the backlight module according to the output synchronous signal.

Since the problem-solving principle of the driving method is similar to the problem-solving principle of the above-mentioned backlight control chip, the implementation of the driving method provided by the embodiment of the present disclosure can refer to the implementation of the above-mentioned backlight control chip provided by the embodiments of the present disclosure, and will not be repeated.

Figure 4:
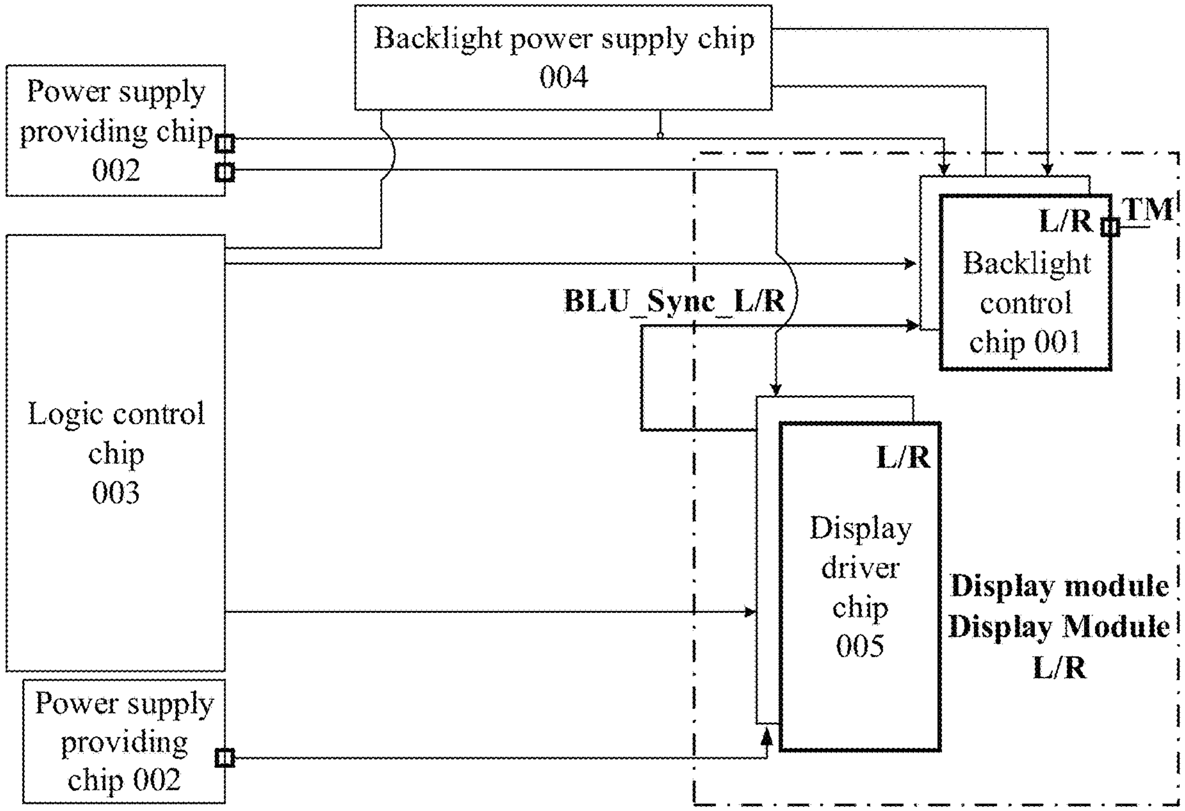
FIG. 4 is a schematic structural diagram of a backlight control system provided by an embodiment of the present disclosure.

Based on the same inventive concept, an embodiment of the present disclosure provides a backlight control system, as shown in FIG. 4, which may include: the backlight control chip (back light unit integrated circuit, BLU IC) 001 provided by the embodiments of the present disclosure, a power supply providing chip (power management integrated circuit, PMIC) 002, a logic control chip (AP) 003, a backlight power supply (BLU power supply) chip 004 and a display driver chip (display driver integrated circuit, DDIC) 005; wherein, the power supply providing chip 002 is configured to provide a working voltage for the backlight control chip 001, the logic control chip 003, the backlight power supply chip 004 and the display driver chip 005; the logic control chip 003 is configured to control enabling and logic operation of the backlight control chip 001, the backlight power supply chip 004, and the display driver chip 005; the backlight power supply chip 004 is configured to provide a driving voltage for the backlight module; and the display driver chip 005 is configured to provide a driving voltage for the display module and a fixed frequency signal VSYNC for the backlight control chip 001.

Figure 5:
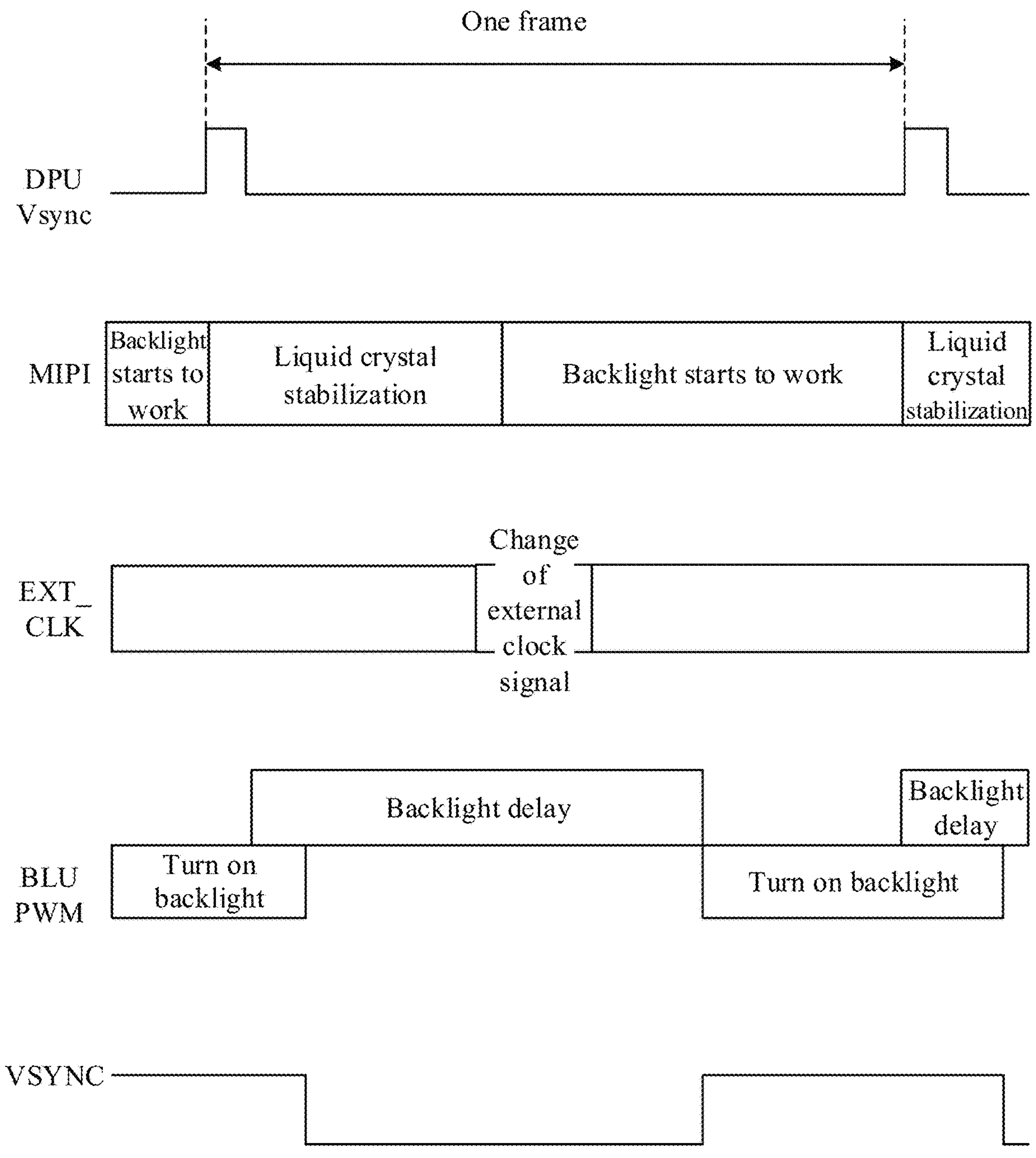
FIG. 5 is a timing chart of backlight variable-frequency control provided by an embodiment of the present disclosure.

Optionally, as shown in FIG. 5, within one frame of time: under the trigger of the display data signal MIPI, the liquid crystal stabilization time duration is first entered, and then the backlight starts to work; the variable-frequency clock signal ECT_CLK as an external dynamic clock signal starts to be input to the backlight control chip 001; the backlight driving timing BLU_PWM is a square wave signal that drives the backlight to light up, and runs through the process of lighting up the backlight module in each region; and at the same time, the fixed frequency signal VSYNC as an external input signal can make the backlight control chip 001 work in a fixed-frequency state. In some embodiments, the backlight control chip 001 can also work in the variable-frequency state based on the synchronous signal HVSYNC_IN generated according to the external variable-frequency clock signal EXT_CLK.

Based on the same inventive concept, an embodiment of the present disclosure provides a near-eye display device, including a display module, a backlight module, and the above-mentioned backlight control system. Since the problem-solving principle of the near-eye display device is similar to the problem-solving principle of the above-mentioned backlight control chip, the implementation of the near-eye display device can refer to the implementation of the above-mentioned backlight control chip, and will not be repeated.

In some embodiments, the above-mentioned near-eye display device provided by the embodiments of the present disclosure may also include, but not limited to components such as a radio frequency unit, a network module, an audio output & input unit, a user input unit, an interface unit, and a memory. In addition, those skilled in the art can understand that the above structure does not constitute a limitation on the above-mentioned near-eye display device provided by the embodiment of the present disclosure. In other words, the above-mentioned near-eye display device provided by the embodiment of the present disclosure may include more or fewer components, or combinations of certain components, or different arrangements of components.

Apparently, those skilled in the art can make various changes and variations to the embodiments of the present disclosure without departing from the spirit and scope of the embodiments of the present disclosure. In this way, if these modifications and variations of the embodiments of the present disclosure fall within the scope of the claims of the present disclosure and their equivalent technologies, the present disclosure also intends to include these modifications and variations.

What is claimed is:

1. A backlight control chip for driving a backlight module, comprising:

a boosting circuit, configured to receive a variable-frequency clock signal and boost the variable-frequency clock signal into a synchronous signal; and a gating circuit, configured to at least receive the synchronous signal and frame rate control signals, and control output of the synchronous signal in response to the frame rate control signals;

a first voltage stabilization filter circuit, configured to perform voltage stabilization and filtering processing on the variable-frequency clock signal provided by a clock signal terminal, and provide the variable-frequency clock signal after the voltage stabilization and filtering processing to the boosting circuit.

2. The backlight control chip according to claim 1, wherein the gating circuit is configured to:

receive the synchronous signal, a fixed frequency signal, a variable-frequency signal, a first frame rate control signal and a second frame rate control signal;

control switching output between the synchronous signal and the variable-frequency signal in response to the first frame rate control signal; and then control switching output between the synchronous signal or the variable-frequency signal and the fixed frequency signal in response to the second frame rate control signal;

wherein the fixed frequency signal is used for completing generation of a main clock signal inside the backlight control chip, the variable-frequency signal is not associated with the refresh rate of the variable-frequency display, and the frame rate control signals comprise the first frame rate control signal and the second frame rate control signal.

3. The backlight control chip according to claim 2, wherein the gating circuit comprises a first gating device and a second gating device, wherein a control terminal of the first gating device is loaded with the first frame rate control signal, a first input terminal of the first gating device is loaded with the variable-frequency signal, and a second input terminal of the first gating device is loaded with the synchronous signal; and a control terminal of the second gating device is loaded with the second frame rate control signal, a first input terminal of the second gating device is electrically connected to an output terminal of the first gating device, and a second input terminal of the second gating device is loaded with the fixed frequency signal.

4. The backlight control chip according to claim 1, wherein the first voltage stabilization filter circuit comprises an even number of cascaded first NOT gates.

5. The backlight control chip according to claim 1, further comprising a protection circuit, wherein the protection circuit is configured to provide an effective level of the variable-frequency clock signal to the first voltage stabilization filter circuit and prevent the effective level in the first voltage stabilization filter circuit from flowing back to the clock signal terminal.

6. The backlight control chip according to claim 5, wherein the protection circuit comprises: a first resistor, a second resistor, a third resistor, a diode, a switching transistor, a second NOT gate, a third NOT gate and a first AND gate;

wherein the first resistor is connected between the clock signal terminal and the first voltage stabilization filter circuit, a first terminal of the second resistor is electrically connected to the first voltage stabilization filter circuit, a second terminal of the second resistor is electrically connected to a first terminal of the third resistor, a second terminal of the third resistor is grounded, an anode of the diode is grounded, a cathode of the diode is electrically connected to the clock signal terminal, a control terminal of the switching transistor is electrically connected to an output terminal of the first AND gate, a first electrode of the switching transistor is electrically connected to the second terminal of the second resistor, a second electrode of the switching transistor is grounded, an input terminal of the second NOT gate is electrically connected to the second terminal of the second resistor, an output terminal of the second NOT gate is electrically connected to an input terminal of the third NOT gate, a first input terminal of the first AND gate is electrically connected to the output terminal of the second NOT gate, and a second input terminal of the first AND gate is loaded with the first frame rate control signal.

7. The backlight control chip according to claim 1, further comprising a second voltage stabilization filter circuit, wherein the second voltage stabilization filter circuit is configured to perform voltage stabilization and filtering processing on the synchronous signal, and provide the synchronous signal after the voltage stabilization and filtering processing to the gating circuit.

8. The backlight control chip according to claim 7, wherein the second voltage stabilization filter circuit comprises an even number of cascaded fourth NOT gates.

9. The backlight control chip according to claim 7, further comprising a noise reduction circuit, wherein the noise reduction circuit is configured to perform noise reduction processing on the synchronous signal after the voltage stabilization and filtering processing, and provide the synchronous signal after the noise reduction processing to the gating circuit.

10. The backlight control chip according to claim 9, wherein the noise reduction circuit comprises: a fourth resistor and a capacitor, wherein the fourth resistor is connected between the second voltage stabilization filter circuit and the gating circuit, and the capacitor is connected between the gating circuit and ground.

11. The backlight control chip according to claim 1, further comprising an analog phase locker, wherein the analog phase locker is configured to generate a backlight driving timing with the same refresh rate as an output signal of the gating circuit in response to the output signal of the gating circuit.

12. The backlight control chip according to claim 11, further comprising a digital phase locker, wherein the digital phase locker is configured to receive a fixed frequency signal and generate a variable-frequency signal according to the fixed frequency signal.

13. The backlight control chip according to claim 12, further comprising a second voltage stabilization filter circuit, wherein the second voltage stabilization filter circuit is configured to provide a stable analog enabling signal to the analog phase locker, and provide a stable digital enabling signal to the digital phase locker.

14. The backlight control chip according to claim 13, wherein the second voltage stabilization filter circuit comprises: a fifth NOT gate, a sixth NOT gate, a seventh NOT gate, a second AND gate, a third AND gate, a fourth AND gate, and an OR gate;

wherein, an input terminal of the fifth NOT gate is loaded with the second frame rate control signal, an output terminal of the fifth NOT gate is electrically connected to the first input terminal of the second AND gate, the second input terminal of the second AND gate is loaded with a trigger signal, the output terminal of the second AND gate is electrically connected to an enabling input terminal of the digital phase locker, an input terminal of the sixth NOT gate is electrically connected to a first output terminal of the digital phase locker, an output terminal of the sixth NOT gate is electrically connected to a first input terminal of the seventh NOT gate, a second input terminal of the seventh NOT gate is electrically connected to the output terminal of the fifth NOT gate, an output terminal of the seventh NOT gate is electrically connected to the first input terminal of the third AND gate, the second input terminal of the third AND gate is loaded with the trigger signal, the output terminal of the third AND gate is electrically connected to the enabling input terminal of the analog phase locker, a first input terminal of the fourth AND gate is loaded with the analog enabling signal, a first input terminal of the fourth AND gate is loaded with the first frame rate control signal, an output terminal of the fourth AND gate is electrically connected to a first input terminal of the OR gate, and a second input terminal of the OR gate is electrically connected with a second output terminal of the digital phase locker.

15. A method for driving the backlight control chip according to claim 1, comprising:

receiving the variable-frequency clock signal and boosting the variable-frequency clock signal into the synchronous signal, wherein both the variable-frequency clock signal and the synchronous signal have the same refresh rate as the variable-frequency display; and at least receiving the synchronous signal and the frame rate control signals, and controlling output of the synchronous signal in response to the frame rate control signals, to drive the backlight module according to the output synchronous signal.

16. A backlight control system, comprising: the backlight control chip according to claim 1, a power supply providing chip, a logic control chip, a backlight power supply chip, and a display driver chip; wherein, the power supply providing chip is configured to provide a working voltage for the backlight control chip, the logic control chip, the backlight power supply chip and the display driver chip;

the logic control chip is configured to control enabling and logic operation of the backlight control chip, the backlight power supply chip, and the display driver chip;

the backlight power supply chip is configured to provide a driving voltage for the backlight module; and the display driver chip is configured to provide a driving voltage for a display module and a fixed frequency signal for the backlight control chip.

17. A near-eye display device, comprising the display module, the backlight module and the backlight control system according to claim 16.

18. The backlight control chip according to claim 2, wherein both the variable-frequency clock signal and the synchronous signal have the same refresh rate as variable-frequency display.

19. The backlight control chip according to claim 4, further comprising a protection circuit, wherein the protection circuit is configured to provide an effective level of the variable-frequency clock signal to the first voltage stabilization filter circuit and prevent the effective level in the first voltage stabilization filter circuit from flowing back to the clock signal terminal.

20. A backlight control chip for driving a backlight module, comprising:

a boosting circuit, configured to receive a variable-frequency clock signal and boost the variable-frequency clock signal into a synchronous signal; and a gating circuit, configured to at least receive the synchronous signal and frame rate control signals, and control output of the synchronous signal in response to the frame rate control signals;

wherein the gating circuit is configured to:

receive the synchronous signal, a fixed frequency signal, a variable-frequency signal, a first frame rate control signal and a second frame rate control signal;

control switching output between the synchronous signal and the variable-frequency signal in response to the first frame rate control signal; and then control switching output between the synchronous signal or the variable-frequency signal and the fixed frequency signal in response to the second frame rate control signal;

wherein the fixed frequency signal is used for completing generation of a main clock signal inside the backlight control chip, the variable-frequency signal is not associated with the refresh rate of the variable-frequency display, and the frame rate control signals comprise the first frame rate control signal and the second frame rate control signal.

* * * * *